(No Model.)

S. L. BRANDT.
BROOM HEAD.

No. 576,513. Patented Feb. 2, 1897.

Witnesses:
C. Emlen Urban
Fred P. Mentzer

Inventor:
Simon L. Brandt
By Daniel H. Herr
Attorney.

UNITED STATES PATENT OFFICE.

SIMON L. BRANDT, OF MARIETTA, PENNSYLVANIA, ASSIGNOR OF ONE-HALF TO HENRY C. GRADY, OF SAME PLACE.

BROOM-HEAD.

SPECIFICATION forming part of Letters Patent No. 576,513, dated February 2, 1897.

Application filed October 21, 1896. Serial No. 609,497. (No model.)

*To all whom it may concern:*

Be it known that I, SIMON L. BRANDT, a citizen of the United States, residing at Marietta, in the county of Lancaster and State of Pennsylvania, have invented certain new and useful Improvements in a Continuous-Wire Broom-Head; and I do hereby declare the following to be a full, clear, and exact description of the invention, such as will enable others skilled in the art to which it appertains to make and use the same.

This invention relates to improvements in a broom-head of that class in which the straw or broom-corn holding members and the handle-securing socket constituting the framework are made from a continuous wire in one piece, the members being compressed and secured together by headed bolts transversely placed and their headless ends secured by any approved means, such as nuts screwed home thereon or cotter-pins passed therethrough.

The object of the invention is the production of a simple and convenient device that may be repeatedly used in broom-making to effectively hold together in proper shape the straw, splints, or broom-corn, as well as the handle, of which the broom is made, securely in place until they shall be completely worn out, when they may be readily removed and replaced by new ones.

The elements of the invention will at large appear in the following description, and will be particularly set forth in the claim.

The purposes of the invention are attained by the mechanism and devices illustrated in the accompanying drawings, similar reference-letters designating like parts throughout the several views, in which—

Figure 1:
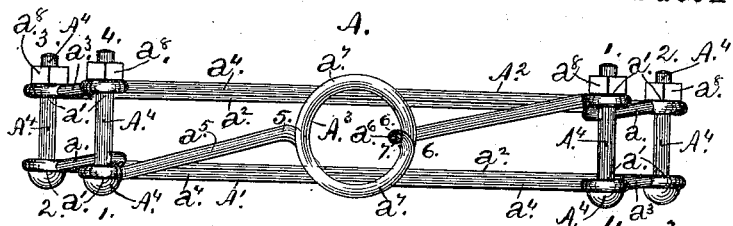
Figure 2:
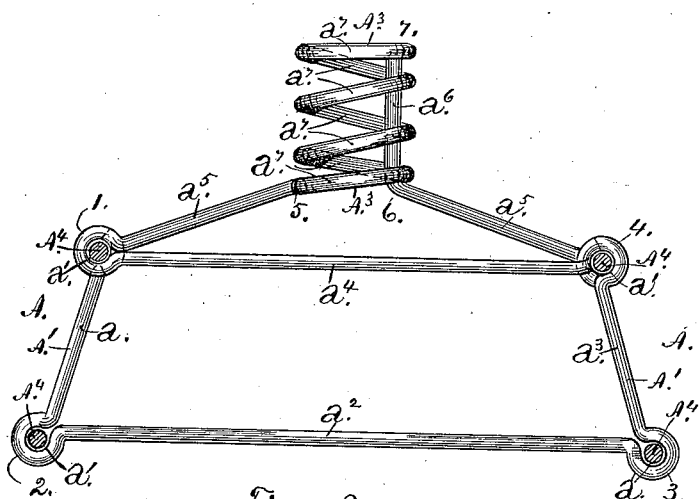
Figure 3:
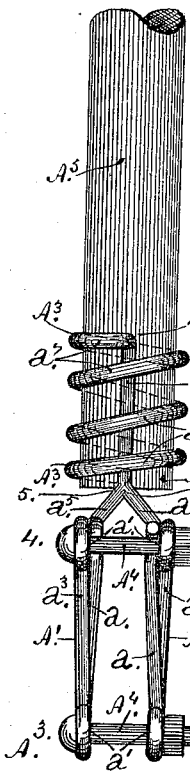
Figure 4:
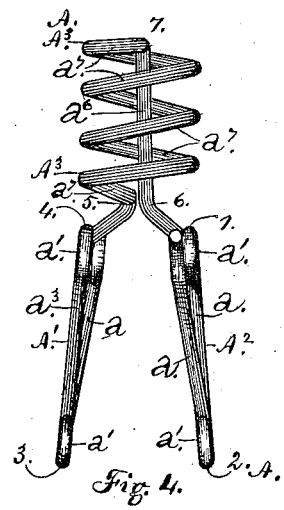

Figure 1 is a top view of a broom-head embodying the elements of the invention; Fig. 2, a view from the side of Fig. 1 with the bolt-heads removed and the bolts appearing in section; Fig. 3, an elevation from the right of Fig. 1 with the lower portion of a handle in place; Fig. 4, a similar view to Fig. 3 with the handle, the binding-bolts, and nuts removed; and Fig. 5, a view similar to Fig. 2, on a reduced scale, showing a modification in the formation of the bolt-eyes with a middle eye introduced in the lower side bars and the stem ends of a sufficient quantity of broomcorn in place, forming a broom.

In the head A of the invention are two quadrangular sides or members $A'$ $A^2$, practically trapezoidal in form, each having, beginning at 1, a downwardly and outwardly sloping end bar $a$, extending from 1 to 2, where said bars are folded over into eyes $a'$, as shown, thence continued in horizontally-disposed lower side bars $a^2$, extending from 2 to 3, where they are also turned over into eyes, (also indicated by $a'$,) thence continued in upwardly and inwardly sloping end bars $a^3$, extending from 3 to 4, where they are again turned over into eyes, (again indicated by $a'$,) thence continued by horizontally-disposed side bars $a^4$, parallel to the bars $a^2$ before mentioned, extending from 4 to 1, the beginning-point, where they are likewise turned over into eyes, (likewise indicated by $a'$,) thence continued in upwardly and diagonally disposed bars or arms $a^5$, extending toward the vertical center line of the head, one of them to 5 and the other to 6, where the latter is turned upwardly, forming a vertically-disposed ridge or key $a^6$, extending to a point 7, where it is turned outwardly and continued about the ridge $a^6$ in a vertically-disposed coil $A^3$, constituting the handle-socket, and extending downwardly in a number of spiral folds $a^7$ to the point 5 before mentioned, where the lower fold $a^7$ merges into the former arm or bar $a^5$, as shown.

Figure 5:
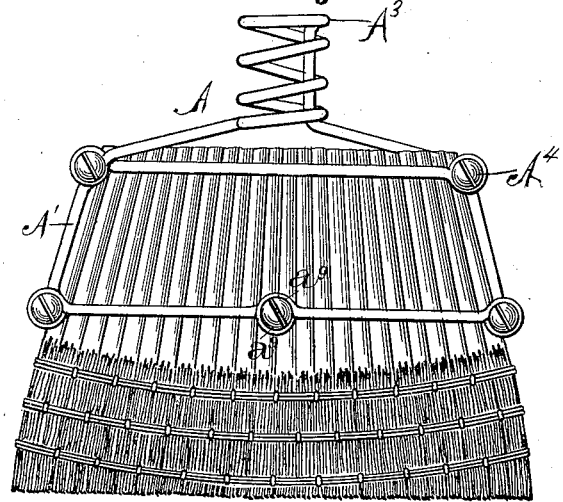

When thus constructed, it will be seen that the framework, with all its parts, of the head A will be made in one piece and from a continuous wire and that the members $A'$ $A^2$ will assume the positions best illustrated in Fig. 4, showing them situated in downwardly-diverging planes, but adapted to be pressed together and secured in position by means of bolts $A^4$, passed through the eyes $a'$, with nuts $a^8$ screwed home onto the threaded ends of said bolts, and when the stem ends of a sufficient quantity of broom-corn have been placed between the members $A'$ $A^2$ and compressed by means of the bolts $A^4$ with the nuts $a^8$ screwed home thereon a broom such as is shown in Fig. 5 will be readily formed, and when a handle $A^5$ is inserted into the coil $A^3$, as shown in Fig. 3, said broom will be completed.

It will here be observed that when a handle is inserted into the coil $A^3$, as above mentioned, the ridge $a^6$ being pressed into a groove in the handle, as shown in Fig. 3, will act as a key seated in a shaft, preventing said handle from turning, and that the pressing of the members $A'$ $A^2$ together, also as shown in Fig. 3, will compress the folds of the coil onto the handle, holding it securely in place; also, that the beginning ends of the bars $a$ at the points 1 being provided with partial eyes, as shown, will rest against the inner faces of the bolts $A^4$ at said points as well as against the adjacent inner faces of the upper side bars $a^4$, and, when so desired, eyes may be formed at the middle points of the lower side bars $a^2$ and bolts with nuts thereon applied therethrough, as shown at $a^9$ in Fig. 5.

It is preferred to arrange the folds at the angles 1, 2, 3, and 4, forming the eyes $a'$ aforementioned, so as to be situated entirely in the planes of the members $A'$ $A^2$, as shown in Figs. 1, 2, 3, and 4, but they may be made in entire coils, as shown in Fig. 5, to form said eyes without changing the character of the invention, and cotter-pins may be passed through the bolt ends, dispensing with the nuts on said ends.

Having now described the invention and ascertained and set forth the manner in which it is performed, what is considered new, and desired to be secured by Letters Patent, is—

The broom-head A made from a continuous wire comprising the members $A'$ $A^2$ having the downwardly and outwardly sloping end bars $a$, the lower side bars $a^2$, the upwardly and inwardly sloping end bars $a^3$, and the upper side bars $a^4$, with the bolt-receiving eyes $a'$ at the angles 1, 2, 3, 4, where said bars are folded over to form said eyes; the upwardly-sloping diagonal arms $a^5$ merged from the bars $a^4$ at the angles 1 and extended to the points 5 and 6; the vertically-disposed ridge $a^6$ continued from one of the arms $a^5$ and extended upwardly to the point 7; the handle-socket coil $A^3$ having the spiral folds $a^7$ about said ridge with its upper fold merged from the upper end thereof and its lower fold merged into the other arm $a^5$ at the point 5; and means provided, such as bolts $A^4$, passed through said eyes, with nuts $a^8$ thereon, to press and hold said members together, all substantially as described and for the purpose hereinbefore set forth.

In testimony whereof I affix my signature in presence of two witnesses.

SIMON L. BRANDT.

Witnesses:
A. F. SHENCK,
FRED. P. MENTZER.